US012755744B2

(12) United States Patent
Kim et al.

(10) Patent No.: US 12,755,744 B2
(45) Date of Patent: *Oct. 6, 2026

(54) SIGNALING FOR RENDERING TOOLS

(71) Applicant: QUALCOMM Incorporated, San Diego, CA (US)

(72) Inventors: Moo Young Kim, San Diego, CA (US); Nils Günther Peters, Erlangen (DE); Dipanjan Sen, Dublin, CA (US); Siddhartha Goutham Swaminathan, San Diego, CA (US); S M Akramus Salehin, San Diego, CA (US); Jason Filos, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 104 days.

This patent is subject to a terminal disclaimer.

(21) Appl. No.: 18/640,790

(22) Filed: Apr. 19, 2024

(65) Prior Publication Data

US 2024/0274141 A1 Aug. 15, 2024

Related U.S. Application Data

(63) Continuation of application No. 17/180,255, filed on Feb. 19, 2021, now Pat. No. 11,967,329.

(30) Foreign Application Priority Data

Feb. 20, 2020 (GR) .............................. 20200100088

(51) Int. Cl.

| | |
|---|---|
| ***G10L 19/02*** | (2013.01) |
| ***H04S 3/00*** | (2006.01) |
| ***H04S 7/00*** | (2006.01) |

(52) U.S. Cl.

CPC .............. *G10L 19/02* (2013.01); *H04S 7/303* (2013.01); *H04S 2420/01* (2013.01)

(58) Field of Classification Search

CPC ....... G10L 19/00; G10L 19/02; G10L 19/002; G10L 19/008; G10L 19/167;

(Continued)

(56) References Cited

U.S. PATENT DOCUMENTS 10,405,126 B2 9/2019 Peters et al.
11,967,329 B2 4/2024 Kim et al.

(Continued)

FOREIGN PATENT DOCUMENTS

WO WO-2019197404 A1 * 10/2019 ........... G10L 19/008

OTHER PUBLICATIONS

"Information Technology, High Efficiency Coding and Media Delivery in Heterogeneous Environments, Part 3, 3D audio", ISO/IEC JTC 1/SC 29, 23008-3:201x(E), Oct. 12, p. 797, IDS filed on Apr. 14, 2021 (Year: 2016).*

(Continued)

*Primary Examiner* — Leshui Zhang
(74) *Attorney, Agent, or Firm* — QUALCOMM Incorporated; Espartaco Diaz Hidalgo

(57) ABSTRACT

An example audio decoding device includes a memory configured to store at least a portion of a coded audio bitstream; and one or more processors configured to: decode, based on the coded audio bitstream, a representation of a soundfield; decode, based on the coded audio bitstream, a syntax element indicating a selection of either a head-related transfer function (HRTF) or a binaural room impulse response (BRIR); and render, using the selected HRTF or BRIR, speaker feeds from the soundfield.

17 Claims, 9 Drawing Sheets

(58) Field of Classification Search
CPC ....... G10L 19/038; G10L 19/16; H04S 7/303; H04S 7/00; H04S 7/008; H04S 7/304; H04S 7/30; H04S 3/008; H04S 2420/00; H04S 2420/01; H04R 27/00; G06F 3/165; G06F 3/011; G06F 3/162
USPC ......... 704/500–504; 381/1–23, 300–310, 61, 381/63, 74, 312–321, 123
See application file for complete search history.

(56) References Cited

U.S. PATENT DOCUMENTS

| | | | | |
|---|---|---|---|---|
| 2011/0249821 | A1 | 10/2011 | Jaillet et al. | |
| 2013/0202129 | A1* | 8/2013 | Kraemer | H04S 7/308 704/500 |
| 2014/0355796 | A1* | 12/2014 | Xiang | H04S 7/305 381/303 |
| 2017/0188174 | A1 | 6/2017 | Lee et al. | |
| 2018/0075764 | A1 | 3/2018 | Bachani | |
| 2018/0192177 | A1 | 7/2018 | Krisztal | |
| 2019/0246236 | A1* | 8/2019 | Ehara | G10L 19/008 |
| 2021/0168550 | A1* | 6/2021 | Terentiv | G10L 19/167 |

OTHER PUBLICATIONS

Audio: “Call for Proposals for 3D Audio”, International Organisation for Standardisation Organisation Internationale De Normalisation, ISO/IEC JTC1/SC29/WG11, Coding of Moving Pictures and Audio, ISO/IEC JTC1/SC29/WG11/ N13411, Geneva, Jan. 2013, pp. 1-20.
ETSI TS 103 589 V1.1.1, “Higher Order Ambisonics (HOA) Transport Format”, Jun. 2018, 33 pages.
Herre J., et al., “MPEG-H 3D Audio—The New Standard for Coding of Immersive Spatial Audio”, IEEE Journal of Selected Topics in Signal Processing, vol. 9, No. 5, Aug. 1, 2015 (Aug. 1, 2015), XP055243182, pp. 770-779.
Hollerweger F., “An Introduction to Higher Order Ambisonic”, Oct. 2008, pp. 1-13, http://decoy.iki.fi/dsound/ambisonic/motherlode/source/HOA_intro.pdf.
“Information Technology—High Efficiency Coding and Media Delivery in Heterogeneous Environments—Part 3: 3D Audio”, ISO/IEC JTC 1/SC 29, ISO/IEC DIS 23008-3, Jul. 25, 2014, 433 Pages.
“Information Technology—High Efficiency Coding and Media Delivery in Heterogeneous Environments—Part 3: 3D Audio”, ISO/IEC JTC 1/SC 29/WG11, ISO/IEC 23008-3, 201x(E), Oct. 12, 2016, 797 Pages.
“Information Technology—High Efficiency Coding and Media Delivery in Heterogeneous Environments—Part 3: Part 3: 3D Audio, Amendment 3: MPEG-H 3D Audio Phase 2,” ISO/IEC JTC 1/SC 29N, ISO/IEC 23008-3:2015/PDAM 3, Jul. 25, 2015, 208 Pages.
ISO/IEC/JTC: ISO/IEC JTC 1/SC 29 N ISO/IEC CD 23008-3 “Information Technology—High Efficiency Coding and Media Delivery in Heterogeneous Environments—Part 3: 3D Audio”, Apr. 4, 2014 (Apr. 4, 2014), 337 Pages, XP055206371, Retrieved from the Internet: URL: http://www.iso.org/iso/iso_catalogue/catalogue_tc/catalogue_tc_browse.htm?commid=45316 [retrieved on Aug. 5, 2015].
Kim M-Y., et al., “Towards a Unified 6DOF VR Evaluation Framework for MPEG-I”, Coding of Moving Pictures and Audio, ISO/IEC JTC1/SC29/WG11 MPEG2018/M44878, Macau, China, Oct. 2018, 4 pages.
Peterson J., et al., “Virtual Reality, Augmented Reality, and Mixed Reality Definitions”, EMA, version 1.0, Jul. 7, 2017, 4 Pages.
Poletti M.A., “Three-Dimensional Surround Sound Systems Based on Spherical Harmonics”, The Journal of the Audio Engineering Society, vol. 53, No. 11, Nov. 2005, pp. 1004-1025.
Schonefeld V., “Spherical Harmonics”, Jul. 1, 2005, XP002599101, 25 Pages, Accessed online [Jul. 9, 2013] at URL: http://limbicsoft.com/volker/prosem_paper.pdf.
Sen D., et al., “RM1-HOA Working Draft Text”, 107. MPEG Meeting, Jan. 13-Jan. 17, 2014, (Motion Picture Expert Group or ISO/IEC JTC1/SC29/WG11, MPEG2014/M31827), No. M31827, Jan. 11, 2014, San Jose, USA, XP030060280, 83 Pages.
Sen D., et al., “Technical Description of the Qualcomm’s HOA Coding Technology for Phase II”, 109th MPEG Meeting, Jul. 7-Nov. 7, 2014, Sapporo, Japan, (Motion Picture Expert Group or ISO/IEC JTC1/SC29/WG11), MPEG2014, No. M34104, Jul. 2, 2014 (Jul. 2, 2014), XP030062477, 4 Pages.

* cited by examiner

SIGNALING FOR RENDERING TOOLS

This application is a continuation of U.S. patent application Ser. No. 17/180,255, filed 19 Feb. 2021, which claims the benefit of Greece Patent Application No. 20200100088, filed Feb. 20, 2020, the entire contents of each of which are hereby incorporated by reference in their entirety.

TECHNICAL FIELD

This disclosure relates to processing of audio data.

BACKGROUND

Computer-mediated reality systems are being developed to allow computing devices to augment or add to, remove or subtract from, or generally modify existing reality experienced by a user. Computer-mediated reality systems may include, as a couple of examples, virtual reality (VR) systems, augmented reality (AR) systems, and mixed reality (MR) systems. The perceived success of computer-mediated reality systems are generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring a adequate auditory experience is an increasingly import factor in ensuring a realistically immersive experience, particularly as the video experience improves to permit better localization of video objects that enable the user to better identify sources of audio content.

SUMMARY

This disclosure generally relates to techniques for signaling the use of renders and associated parameters for audio data. The techniques may improve the listener experience, as the use or disuse of renderers may better preserve the artistic intent of the content producer.

As one example, an audio decoding device includes a memory configured to store at least a portion of a coded audio bitstream; and one or more processors configured to: decode, based on the coded audio bitstream, a representation of a soundfield; decode, based on the coded audio bitstream, a syntax element indicating a selection of either a head-related transfer function (HRTF) or a binaural room impulse response (BRIR); and render, using the selected HRTF or BRIR, speaker feeds from the soundfield.

As another example, an audio encoding device includes a memory configured to store at least a portion of a coded audio bitstream; and one or more processors configured to: encode, in the coded audio bitstream, a representation of a soundfield; and encode, in the coded audio bitstream, a syntax element indicating a selection of either a head-related transfer function (HRTF) or a binaural room impulse response (BRIR) for rendering the soundfield.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
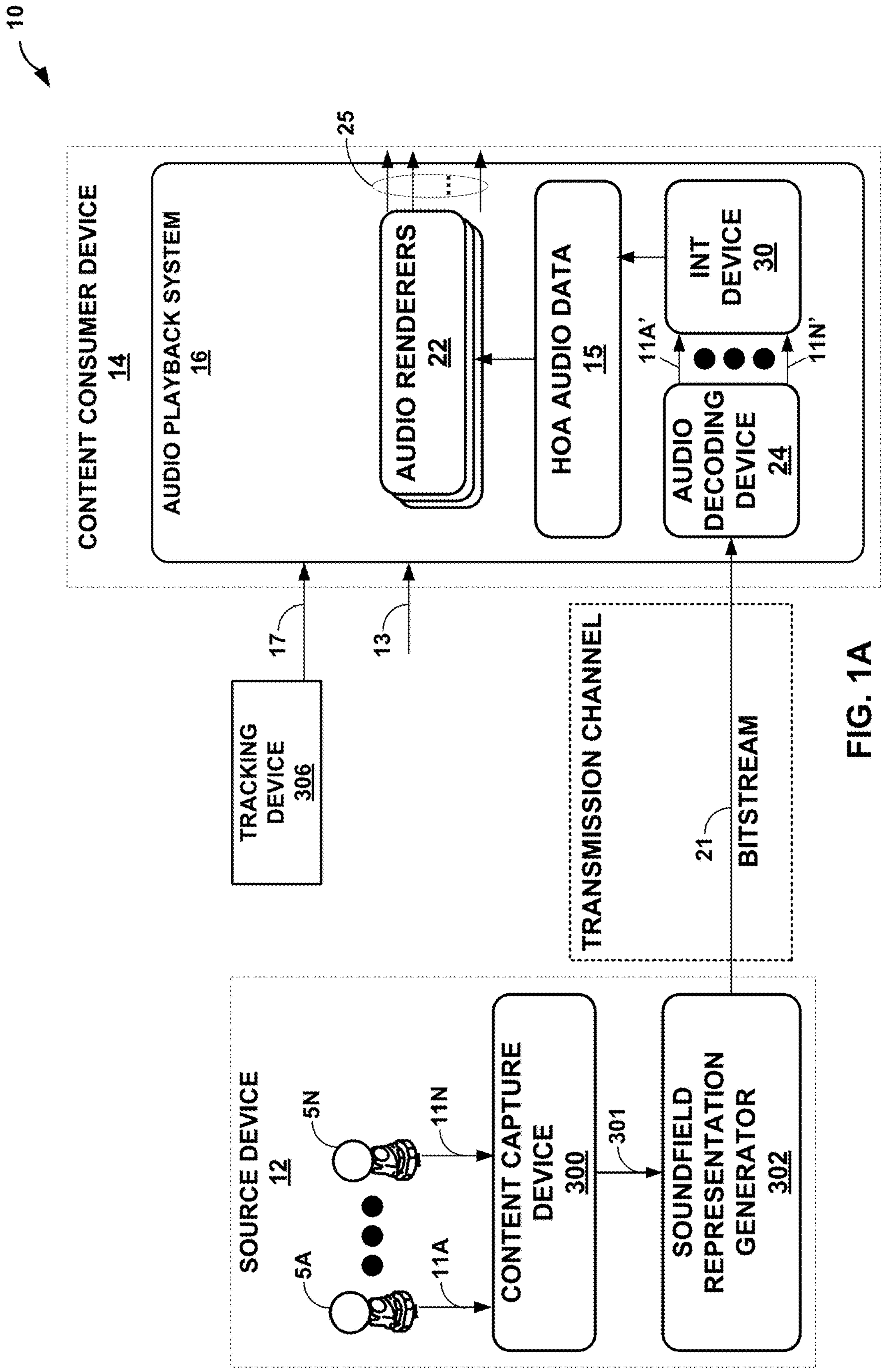
FIGS. 1A and 1B are diagrams illustrating systems that may perform various aspects of the techniques described in this disclosure.

There are various 'surround-sound' channel-based formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend effort to remix it for each speaker configuration. A Moving Pictures Expert Group (MPEG) has released a standard allowing for soundfields to be represented using a hierarchical set of elements (e.g., Higher-Order Ambisonic—HOA—coefficients) that can be rendered to speaker feeds for most speaker configurations, including 5.1 and 22.2 configuration whether in location defined by various standards or in non-uniform locations.

MPEG released the standard as MPEG-H 3D Audio standard, formally entitled "Information technology—High efficiency coding and media delivery in heterogeneous environments—Part 3: 3D audio," set forth by ISO/IEC JTC 1/SC 29, with document identifier ISO/IEC DIS 23008-3, and dated Jul. 25, 2014. MPEG also released a second edition of the 3D Audio standard, entitled "Information technology—High efficiency coding and media delivery in heterogeneous environments—Part 3: 3D audio, set forth by ISO/IEC JTC 1/SC 29, with document identifier ISO/IEC 23008-3:201x(E), and dated Oct. 12, 2016. Reference to the "3D Audio standard" in this disclosure may refer to one or both of the above standards.

As noted above, one example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty}\left[4\pi\sum_{n=0}^{\infty} j_n(kr_r)\sum_{m=-n}^{n} A_n^m(k)Y_n^m(\theta_r, \varphi_r)\right]e^{j\omega t},$$

The expression shows that the pressure $p_i$ at any point $\{r_r, \theta_r, \varphi_r\}$ of the soundfield, at time t, can be represented uniquely by the SHC, $$A_n^m(k).$$

Here $$k = \frac{\omega}{c}, c$$

is the speed of sound (~343 m/s), $\{r_r, \theta_r, \varphi_r\}$ is a point of reference (or observation point), $j_n(\cdot)$ is the spherical Bessel function of order n, and $$Y_n^m(\theta_r, \varphi_r)$$

are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $$A_n^m(k)$$

can either be physically acquired (e.g., recorded) by various microphone array configurations or, alternatively, they can be derived from channel-based or object-based descriptions of the soundfield. The SHC (which also may be referred to as higher order ambisonic—HOA—coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $$A_n^m(k)$$

for the soundfield corresponding to an individual audio object may be expressed as:

$$A_n^m(k) = g(\omega)(-4\pi ik)h_n^{(2)}(kr_s)Y_n^{m^*}(\theta_s, \varphi_s),$$

where i is $$\sqrt{-1}, h_n^{(2)}(\cdot)$$

is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC $$A_n^m(k).$$

Further, it can be shown (since the above is a linear and orthogonal decomposition) that the $$A_n^m(k)$$

coefficients for each object are additive. In this manner, a number of PCM objects can be represented by the $$A_n^m(k)$$

coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$.

Scene-based audio formats, such as the above noted SHC, represent one way by which to represent a soundfield. Other possible formats include channel-based audio formats and object-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include metadata identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Figure 1B:
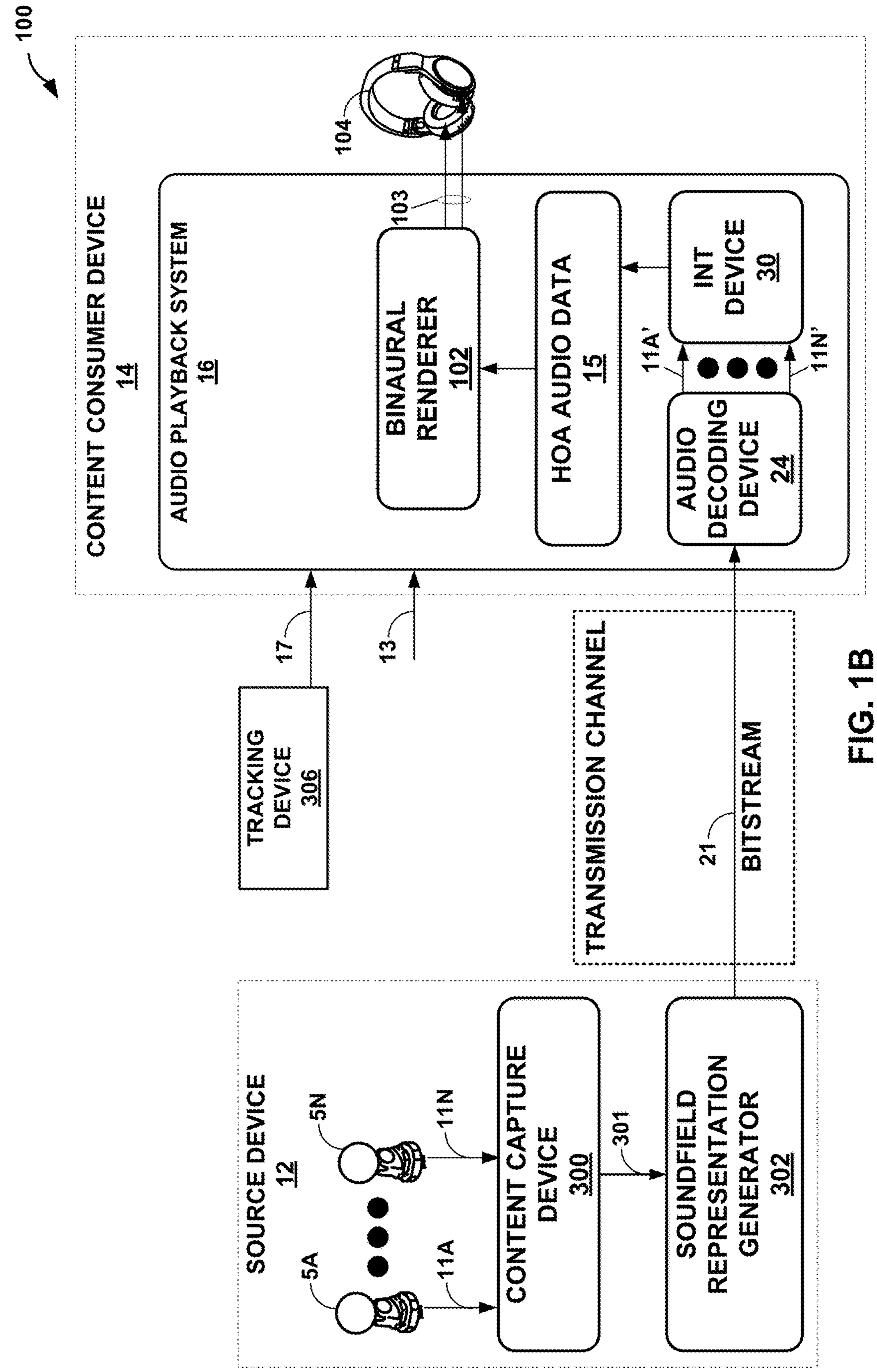

FIGS. 1A and 1B are diagrams illustrating systems that may perform various aspects of the techniques described in this disclosure. As shown in the example of FIG. 1A, system 10 includes a source device 12 and a content consumer device 14. While described in the context of the source device 12 and the content consumer device 14, the techniques may be implemented in any context in which any representation of a soundfield is encoded to form a bitstream representative of the audio data. Moreover, the source device 12 may represent any form of computing device capable of generating the representation of a soundfield, and is generally described herein in the context of being a VR content creator device. Likewise, the content consumer device 14 may represent any form of computing device capable of implementing the occlusion modeling techniques described in this disclosure as well as audio playback, and is generally described herein in the context of being a VR client device.

The source device 12 may be operated by an entertainment company or other entity that may generate multi-channel audio content for consumption by operators of content consumer devices, such as the content consumer device 14. In many VR scenarios, the source device 12 generates audio content in conjunction with video content. The source device 12 includes a content capture device 300 and a soundfield representation generator 302. The content capture device 300 may be configured to interface or otherwise communicate with a microphone 5. The microphone 5 may represent an Eigenmike® or other type of 3D audio microphone capable of capturing and representing the soundfield as audio data 11, which may refer to one or more of the above noted scene-based audio data (such as HOA coefficients), object-based audio data, and channel-based audio data.

The content capture device 300 may, in some examples, include an integrated microphone 5 that is integrated into the housing of the content capture device 300. The content capture device 300 may interface wirelessly or via a wired connection with the microphone 5. Rather than capture, or in conjunction with capturing, audio data via microphone 5, the content capture device 300 may process the audio data 11 after the audio data 11 is input via some type of removable storage, wirelessly and/or via wired input processes. As such, various combinations of the content capture device 300 and the microphone 5 are possible in accordance with this disclosure.

The content capture device 300 may also be configured to interface or otherwise communicate with the soundfield representation generator 302. The soundfield representation generator 302 may include any type of hardware device capable of interfacing with the content capture device 300. The soundfield representation generator 302 may use the audio data 11 provided by the content capture device 300 to generate various representations of the same soundfield represented by the audio data 11.

For instance, to generate the different representations of the soundfield using HOA coefficients (which again is one example of the audio data 11), soundfield representation generator 302 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA OF COMPUTER-MEDIATED REALITY SYSTEMS," and filed Aug. 8, 2017.

To generate a particular MOA representation of the soundfield, the soundfield representation generator 302 may generate a partial subset of the full set of HOA coefficients. For instance, each MOA representation generated by the soundfield representation generator 302 may provide precision with respect to some areas of the soundfield, but less precision in other areas. In one example, an MOA representation of the soundfield may include eight (8) uncompressed HOA coefficients of the HOA coefficients, while the third order HOA representation of the same soundfield may include sixteen (16) uncompressed HOA coefficients of the HOA coefficients. As such, each MOA representation of the soundfield that is generated as a partial subset of the HOA coefficients may be less storage-intensive and less bandwidth intensive (if and when transmitted as part of the bitstream 21 over the illustrated transmission channel) than the corresponding third order HOA representation of the same soundfield generated from the HOA coefficients.

Although described with respect to MOA representations, the techniques of this disclosure may also be performed with respect to full-order ambisonic (FOA) representations in which all of the HOA coefficients for a given order N are used to represent the soundfield. In other words, rather than represent the soundfield using a partial, non-zero subset of the HOA coefficients, the soundfield representation generator 302 may represent the soundfield using all of the HOA coefficients for a given order N, resulting in a total of HOA coefficients equaling $(N+1)^2$.

In this respect, the higher order ambisonic audio data (which is another way to refer to HOA coefficients in either MOA representations or FOA representations) may include higher order ambisonic coefficients associated with spherical basis functions having an order of one or less (which may be referred to as "1$^{st}$ order ambisonic audio data"), higher order ambisonic coefficients associated with spherical basis functions having a mixed order and suborder (which may be referred to as the "MOA representation" discussed above), or higher order ambisonic coefficients associated with spherical basis functions having an order greater than one (which is referred to above as the "FOA representation").

The content capture device 300 may also be configured to interface or otherwise communicate with the soundfield representation generator 302. The soundfield representation generator 302 may include any type of hardware device capable of interfacing with the content capture device 300. The soundfield representation generator 302 may the use audio data 11 provided by the content capture device 300 to generate various representations of the same soundfield represented by the audio data 11. For instance, to generate the different representations of the soundfield using the audio data 11, soundfield representation generator 302 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," and filed Aug. 8, 2017.

To generate a particular MOA representation of the soundfield, the soundfield representation generator 302 may generate a partial subset of the full set of HOA coefficients (e.g., audio data 11). For instance, each MOA representation generated by the soundfield representation generator 302 may provide precision with respect to some areas of the soundfield, but less precision in other areas. In one example, an MOA representation of the soundfield may include eight (8) uncompressed HOA coefficients of the HOA coefficients, while the third order HOA representation of the same soundfield may include sixteen (16) uncompressed HOA coefficients of the HOA coefficients. As such, each MOA representation of the soundfield that is generated as a partial subset of the HOA coefficients may be less storage-intensive and less bandwidth intensive (if and when transmitted as part of the bitstream 21 over the illustrated transmission channel) than the corresponding third order HOA representation of the same soundfield generated from the HOA coefficients.

Although described with respect to MOA representations, the techniques of this disclosure may also be performed with respect to full-order ambisonic (FOA) representations in which all of the HOA coefficients for a given order N are used to represent the soundfield. In other words, rather than represent the soundfield using a partial, non-zero subset of the HOA coefficients, the soundfield representation generator 302 may represent the soundfield using all of the HOA coefficients for a given order N, resulting in a total of HOA coefficients equaling $(N+1)^2$.

In this respect, the audio data 11 may include higher order ambisonic coefficients associated with spherical basis functions having an order of one or less (which may be referred to as "$1^{st}$ order ambisonic audio data"), higher order ambisonic coefficients associated with spherical basis functions having a mixed order and suborder (which may be referred to as the "MOA representation" discussed above), or higher order ambisonic coefficients associated with spherical basis functions having an order greater than one (which is referred to above as the "FOA representation").

The content capture device 300 may, in some examples, be configured to wirelessly communicate with the soundfield representation generator 302. In some examples, the content capture device 300 may communicate, via one or both of a wireless connection or a wired connection, with the soundfield representation generator 302. Via the connection between the content capture device 300 and the soundfield representation generator 302, the content capture device 300 may provide content in various forms of content, which, for purposes of discussion, are described herein as being portions of the HOA coefficients.

In some examples, the content capture device 300 may leverage various aspects of the soundfield representation generator 302 (in terms of hardware or software capabilities of the soundfield representation generator 302). For example, the soundfield representation generator 302 may include dedicated hardware configured to (or specialized software that when executed causes one or more processors to) perform psychoacoustic audio encoding (such as a unified speech and audio coder denoted as "USAC" set forth by the Motion Picture Experts Group (MPEG) or the MPEG-H 3D audio coding standard). The content capture device 300 may not include the psychoacoustic audio encoder dedicated hardware or specialized software and instead provide audio aspects of the content 301 in a non-psychoacoustic-audio-coded form. The soundfield representation generator 302 may assist in the capture of content 301 by, at least in part, performing psychoacoustic audio encoding with respect to the audio aspects of the content 301.

The soundfield representation generator 302 may also assist in content capture and transmission by generating one or more bitstreams 21 based, at least in part, on the audio content (e.g., MOA representations and/or third order HOA representations) generated from the HOA coefficients. The bitstream 21 may represent a compressed version of the HOA coefficients (and/or the partial subsets thereof used to form MOA representations of the soundfield) and any other different types of the content 301 (such as a compressed version of spherical video data, image data, or text data).

The soundfield representation generator 302 may generate the bitstream 21 for transmission, as one example, across a transmission channel, which may be a wired or wireless channel, a data storage device, or the like. The bitstream 21 may represent an encoded version of the HOA coefficients (and/or the partial subsets thereof used to form MOA representations of the soundfield) and may include a primary bitstream and another side bitstream, which may be referred to as side channel information. In some instances, the bitstream 21 representing the compressed version of the HOA coefficients may conform to bitstreams produced in accordance with the MPEG-H 3D audio coding standard.

The content consumer device 14 may be operated by an individual, and may represent a VR client device. Although described with respect to a VR client device, content consumer device 14 may represent other types of devices, such as an augmented reality (AR) client device, a mixed reality (MR) client device (or any other type of head-mounted display device), a standard computer, a headset, headphones, or any other device capable of tracking head movements and/or general translational movements of the individual operating the client consumer device 14. As shown in the example of FIG. 1A, the content consumer device 14 includes an audio playback system 16, which may refer to any form of audio playback system capable of rendering SHC (whether in form of third order HOA representations and/or MOA representations) for playback as multi-channel audio content.

While shown in FIG. 1A as being directly transmitted to the content consumer device 14, the source device 12 may output the bitstream 21 to an intermediate device positioned between the source device 12 and the content consumer device 14. The intermediate device may store the bitstream 21 for later delivery to the content consumer device 14, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14, requesting the bitstream 21.

Alternatively, the source device 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 1A.

As noted above, the content consumer device 14 includes the audio playback system 16. The audio playback system 16 may represent any system capable of playing back multi-channel audio data. The audio playback system 16 may include a number of different audio renderers 22. The renderers 22 may each provide for a different form of audio rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode bitstream 21 to output reconstructed audio data 11A'-11N' (which may form the full third order HOA representation or a subset thereof that forms an MOA representation of the same soundfield or decompositions thereof, such as the predominant audio signal, ambient HOA coefficients, and the vector based signal described in the MPEG-H 3D Audio Coding Standard).

As such, the audio data 11A'-11N' ("audio data 11'") may be similar to a full set or a partial subset of the HOA coefficients, but may differ due to lossy operations (e.g., quantization) and/or transmission via the transmission channel. The audio playback system 16 may, after decoding the bitstream 21 to obtain the HOA coefficients 11', obtain HOA audio data 15 from the different streams of HOA coefficients 11', and render the HOA audio data 15 to output speaker feeds 25. The speaker feeds 25 may drive one or more speakers (which are not shown in the example of FIG. 1A for ease of illustration purposes). Ambisonic representations of a soundfield may be normalized in a number of ways, including N3D, SN3D, FuMa, N2D, or SN2D.

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances, or in conjunction with the dynamic determination of the loudspeaker information 13, the audio playback system 16 may prompt a user to interface with the audio playback system 16 and input the loudspeaker information 13.

The audio playback system 16 may select one of the audio renderers 22 based on the loudspeaker information 13. In some instances, the audio playback system 16 may, when none of the audio renderers 22 are within some threshold similarity measure (in terms of the loudspeaker geometry) to the loudspeaker geometry specified in the loudspeaker information 13, generate the one of audio renderers 22 based on the loudspeaker information 13. The audio playback system 16 may, in some instances, generate one of the audio renderers 22 based on the loudspeaker information 13 without first attempting to select an existing one of the audio renderers 22.

When outputting the speaker feeds 25 to headphones, the audio playback system 16 may utilize one of the renderers 22 that provides for binaural rendering using head-related transfer functions (HRTF) or other functions capable of rendering to left and right speaker feeds 25 for headphone speaker playback. The terms "speakers" or "transducer" may generally refer to any speaker, including loudspeakers, headphone speakers, etc. One or more speakers may then playback the rendered speaker feeds 25.

Although described as rendering the speaker feeds 25 from the HOA audio data 11', reference to rendering of the speaker feeds 25 may refer to other types of rendering, such as rendering incorporated directly into the decoding of the HOA audio data 15 from the bitstream 21. An example of the alternative rendering can be found in Annex G of the MPEG-H 3D audio coding standard, where rendering occurs during the predominant signal formulation and the background signal formation prior to composition of the soundfield. As such, reference to rendering of the HOA audio data 15 should be understood to refer to both rendering of the actual HOA audio data 15 or decompositions or representations thereof of the HOA audio data 15 (such as the above noted predominant audio signal, the ambient HOA coefficients, and/or the vector-based signal—which may also be referred to as a V-vector).

Figure 2:
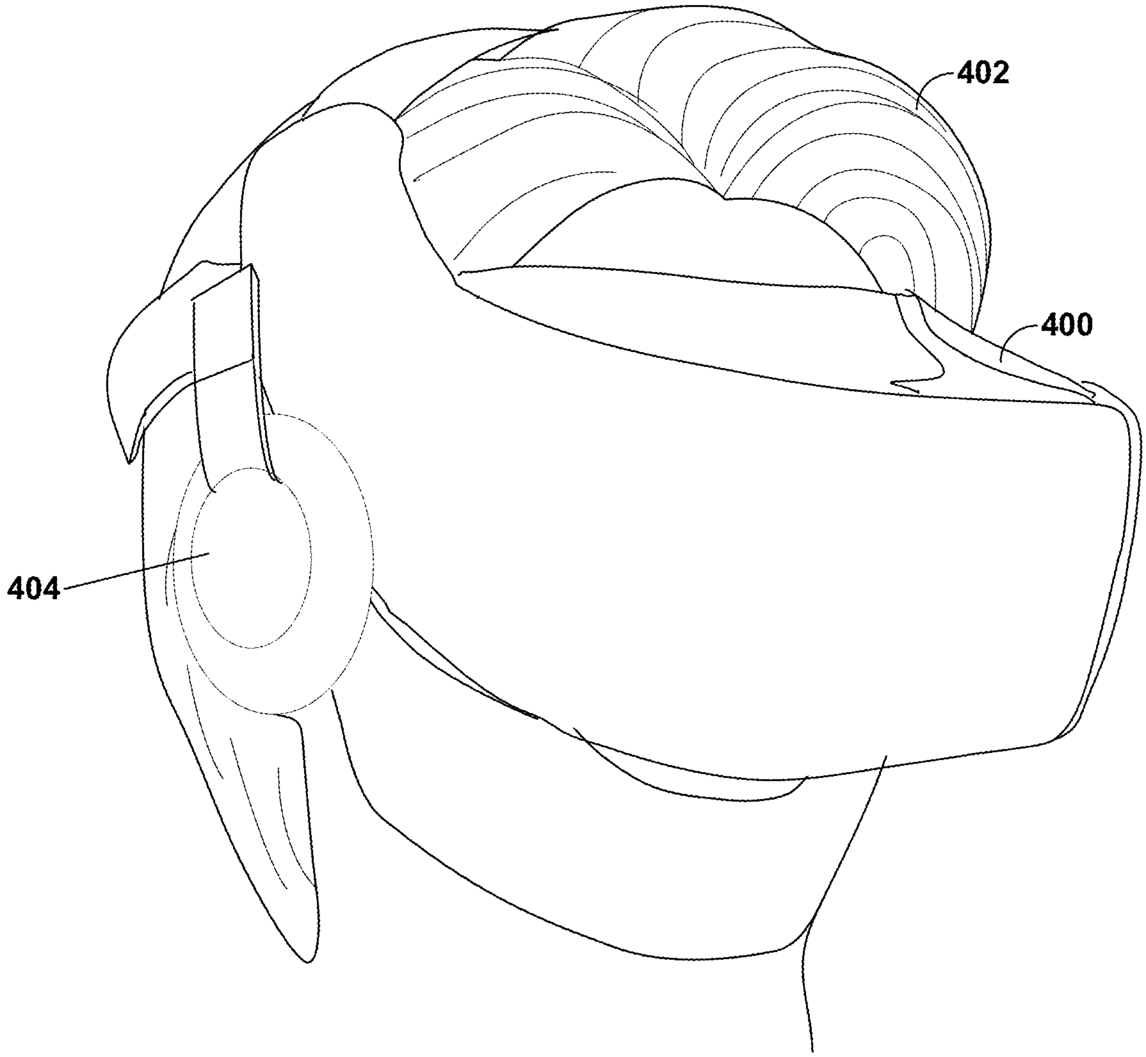
FIG. 2 is a diagram illustrating an example of a VR device worn by a user.

As described above, the content consumer device 14 may represent a VR device in which a human wearable display is mounted in front of the eyes of the user operating the VR device. FIG. 2 is a diagram illustrating an example of a VR device 400 worn by a user 402. The VR device 400 is coupled to, or otherwise includes, headphones 404, which may reproduce a soundfield represented by the HOA audio data 11' (which is another way to refer to HOA coefficients 11') through playback of the speaker feeds 25. The speaker feeds 25 may represent an analog or digital signal capable of causing a membrane within the transducers of headphones 404 to vibrate at various frequencies, where such process is commonly referred to as driving the headphones 404.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may track head movement of the user 402, and adapt the video data shown via the VR headset 400 to account for the head movements, providing an immersive experience in which the user 402 may experience a virtual world shown in the video data in visual three dimensions.

While VR (and other forms of AR and/or MR, which may generally be referred to as a computer mediated reality device) may allow the user 402 to reside in the virtual world visually, often the VR headset 400 may lack the capability to place the user in the virtual world audibly. In other words, the VR system (which may include a computer responsible for rendering the video data and audio data—that is not shown in the example of FIG. 2 for case of illustration purposes, and the VR headset 400) may be unable to support full three dimension immersion audibly.

The audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for VR. As such, the audio aspects of VR are less immersive than the video aspects, thereby potentially reducing the overall immersion experienced by the user, and introducing localization errors (such as when the auditory playback does not match or correlate exactly to the visual scene).

Various ways by which to perform interpolation with respect to the existing audio streams 11 and thereby allow for 6DOF immersion. As described below, the techniques may improve the listener experience, while also reducing soundfield reproduction localization errors, as the interpolated audio stream may better reflect a location of a listener relative to the existing audio streams, thereby improving the operation of a playback device (that performs the techniques to reproduce the soundfield) itself.

In operation, the audio playback system 16 may include an interpolation device 30 ("INT DEVICE 30"), e.g., as shown in FIGS. 1A and 1B, which may be configured to process the audio streams 11 to obtain an interpolated audio stream 15 (which is another way to refer to the HOA audio data 15). Although shown as being a separate device, the interpolation device 30 may be integrated or otherwise incorporated within one of the audio decoding devices 24.

The interpolation device 30 may first obtain one or more microphone locations, each of the one or more microphone locations identifying a location of a microphone that captured the one or more audio streams 11. More information regarding operation of the interpolation device 30 is described with respect to the examples of FIGS. 4 and 5.

Figure 3:
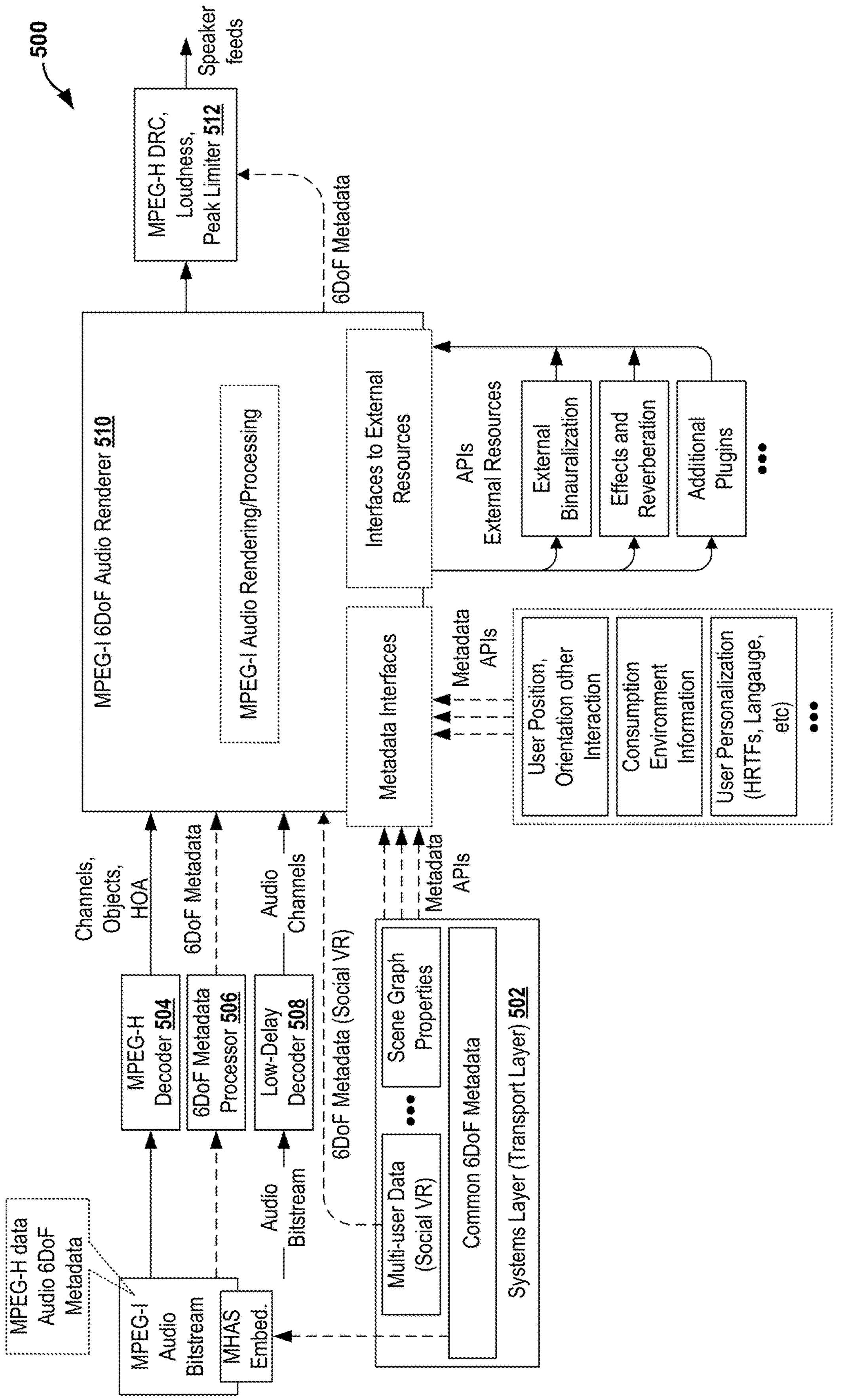
FIG. 3 is a block diagram illustrating an example audio decoder system that may perform various aspects of the techniques described in this disclosure.

FIG. 3 is a block diagram illustrating an example audio decoder system that may perform various aspects of the techniques described in this disclosure. As shown in the example of FIG. 3, decoder system 500 may represent an example MPEG-I audio reference architecture. Decoder system 500 may include a systems layer 502, a MPEG-H decoder 504, a 6DoF metadata processor 506, a low-delay decoder 508, a MPEG-I 6DoF audio renderer 510, and a MPEG-H DRC loudness peak limiter 512. In FIG. 3, dashed connectors may represent metadata while solid connectors may represent audio data.

The systems layer 502, which may also be referred to as a transport layer, may carry various parameters for use by the decoder system 500 when decoding and rendering audio data. As shown in FIG. 3, the systems layer 502 may include common 6DoF metadata, multi-user data (e.g., for use with social VR), and scene graph properties. The systems layer 502 may provide various parameters to various components of the decoder system 500. As one example, the systems layer 502 may provide 6DoF metadata to the MPEG-I 6DoF audio renderer 510. As another example, the systems layer 502 may provide an embedded MPEG-H audio stream (MHAS Embed) for including in an MPEG-I audio bitstream. As another example, the systems layer 502 may provide (e.g., via one or more metadata APIs) various parameters to the audio renderer 510.

The MPEG-H decoder 504 may receive the MPEG-I audio bitstream and decode said bitstream into channels, objects, and/or HOA coefficients. The MPEG-H decoder 504 may provide the decoded data to the audio renderer 510.

The 6DoF metadata processor 506 may process 6DoF metadata from the MPEG-I audio bitstream. The 6DoF metadata processor 506 may the 6DoF metadata to the audio renderer 510.

The low-delay decoder 508 may decode an audio bitstream into one or more audio channels. The low-delay decoder 508 may provide the audio channels to the audio renderer 510.

The audio renderer 510 may perform one or more operations to render audio data for playback at a device (e.g., a VR client device). As shown in FIG. 3, audio renderer 510 may include one or more metadata interfaces and one or more interfaces to external resources. Example metadata interfaces may enable audio renderer 510 to obtain metadata from systems layer 502, or from other sources. Some example metadata includes, but is not limited to, user position, orientation other interaction, consumption environment information, user personalization (e.g., HRTFs, language, etc.). Example interfaces to external resources include external binauralization, effects and reverberation, and additional plugins. The audio renderer 510 may provide the rendered audio data to one or more components, such as directly to the device or to the MPEG-H DRC, loudness, peak limited 512. In some examples, the audio renderer 510 may pass some or all of the 6DoF metadata to the MPEG-H DRC, loudness, peak limited 512.

Some versions of MPEG-H support (e.g., via the systems layer 502) the transmission of: downmix matrices (e.g., for format conversion), HOA rendering matrices, and EQ settings. However, in some examples, it may be desirable for the decoder system 500 to be able to utilize additional tools (e.g., in order to better preserve the artistic intent of a content producer).

In accordance with one or more techniques of this disclosure, the decoder system 500 may be configured to receive, and a corresponding encoder system may be configured to transmit, syntax elements indicating the use/disuse and any relevant parameters of additional audio tools. For instance, the decoder system 500 may receive the syntax elements to better preserve artistic intent in AR/VR applications.

As one example, the decoder system 500 may obtain syntax elements representing a plurality of room reverb coefficient sets, each of the room reverb coefficient sets corresponding to a different candidate position (e.g., multiple room reverb coefficients (RIRs) at variable candidate positions). The audio renderer 510 may then select one of the room reverb coefficient sets based on obtained metadata (e.g., user position/orientation).

As another example, the decoder system 500 may obtain a syntax element (e.g., a flag) indicating a selection of either a head-related transfer function (HRTF) or a binaural room impulse response (BRIR). The audio renderer 510 may then use the selected HRTF or BRIR when rendering the audio data. In some examples, the syntax element may indicate HRTF for outdoor and BRIR for indoor.

As another example, the decoder system 500 may obtain one or more syntax elements to recreate BRIR (HRTF+room reverb characteristics (RIR)→BRIR). Some example, room reverb characteristics/parameters include, but are not limited to, T60, direct to reverberant ratio at specific position, change in direct to reverberant position with distance, and first reflection time. In some examples, the decoder system 500 may utilize these parameters together with a convolution based renderer coefficients (e.g., for high bandwidth TX).

As another example, the decoder system 500 may obtain one or more syntax elements to indicate which audio tools shall be used or shall not be used. Some example audio tools include, but are not limited to, reverb (e.g., for synthetic or recorded scenes), doppler, occlusion, etc. In some examples, the one or more syntax elements that indicate the use of audio tools include a separate flag for each audio tool.

In this way, decoder system 500 may support transmission of one or more of the following:

Multiple room reverb coefficients (RIRs) at variable candidate positions
Parameters to recreate BRIR (HRTF+Room reverb characteristics (RIR)→BRIR)
Flag to tell which BRIR should be used
Flag to tell whether HRTF or BRIR shall be used for binauralization
(Outdoor/Indoor)
Enable/Disable reverb (e.g. for synthetic or recorded scenes)
Enable/Disable doppler
Enable/Disable occlusion, etc.

FIG. 1B is a block diagram illustrating another example system 100 configured to perform various aspects of the techniques described in this disclosure. The system 100 is similar to the system 10 shown in FIG. 1A, except that the audio renderers 22 shown in FIG. 1A are replaced with a binaural renderer 102 capable of performing binaural rendering using one or more HRTFs or the other functions capable of rendering to left and right speaker feeds 103.

The audio playback system 16 may output the left and right speaker feeds 103 to headphones 104, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 104 may couple wirelessly or via wired connection to the additional wearable devices.

Additionally, the headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the HOA coefficients 11. The headphones 104 may include a left headphone speaker and a right headphone speaker which are powered (or, in other words, driven) by the corresponding left and right speaker feeds 103.

Figure 4:
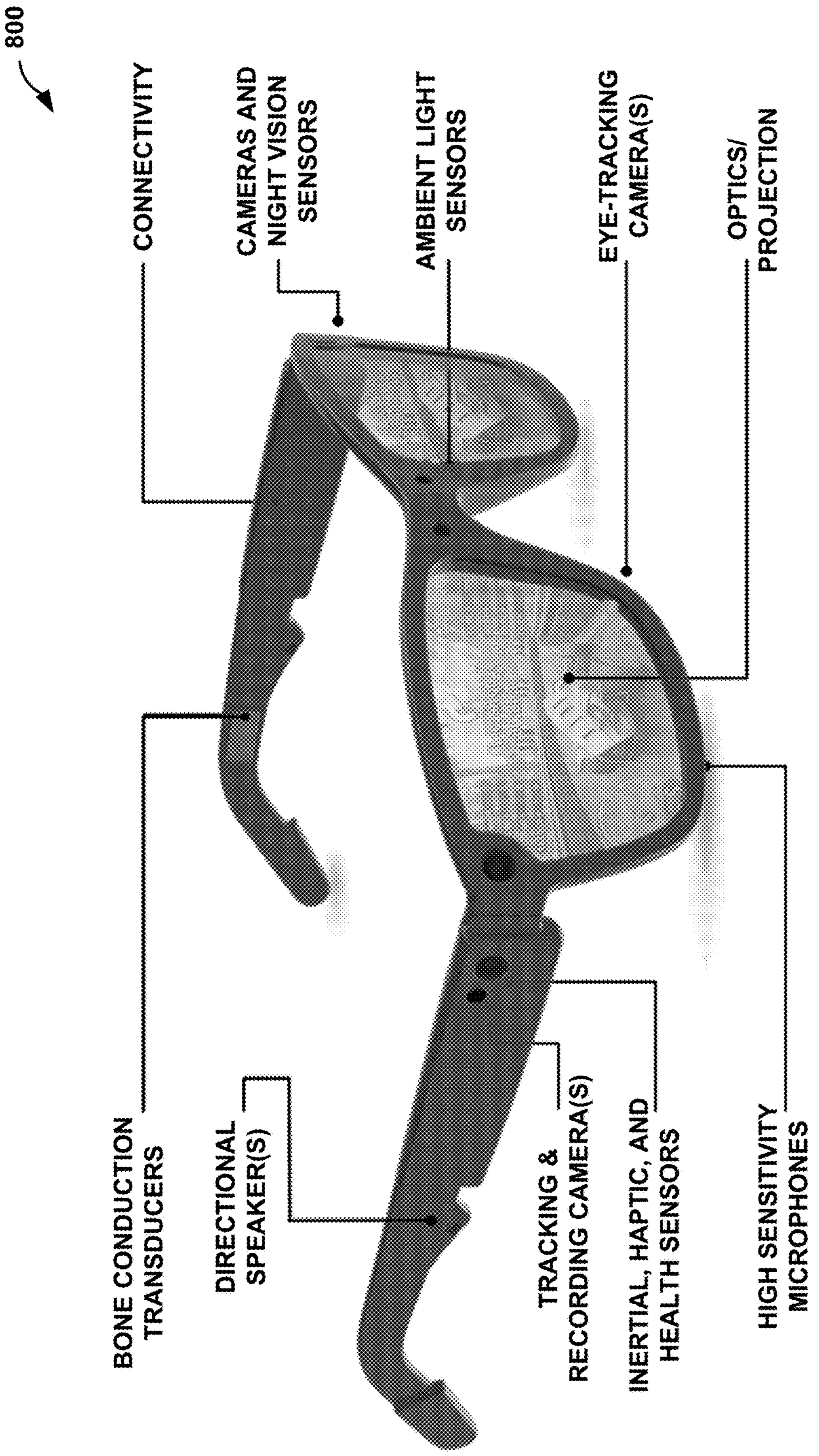
FIG. 4 is a diagram illustrating an example of a wearable device that may operate in accordance with various aspect of the techniques described in this disclosure.

FIG. 4 is a diagram illustrating an example of a wearable device 800 that may operate in accordance with various aspect of the techniques described in this disclosure. In various examples, the wearable device 800 may represent a VR headset (such as the VR headset 400 described above), an AR headset, an MR headset, or an extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may refer to a catchall term for VR, AR, and MR. More information regarding terminology for XR can be found in a document by Jason Peterson, entitled "Virtual Reality, Augmented Reality, and Mixed Reality Definitions, " and dated Jul. 7, 2017.

The wearable device 800 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 800 may communicate with the computing device supporting the wearable device 800 via a wired connection or a wireless connection.

In some instances, the computing device supporting the wearable device 800 may be integrated within the wearable device 800 and as such, the wearable device 800 may be considered as the same device as the computing device supporting the wearable device 800. In other instances, the wearable device 800 may communicate with a separate computing device that may support the wearable device 800. In this respect, the term "supporting" should not be understood to require a separate dedicated device but that one or more processors configured to perform various aspects of the techniques described in this disclosure may be integrated within the wearable device 800 or integrated within a computing device separate from the wearable device 800.

For example, when the wearable device 800 represents the VR device 400, a separate dedicated computing device (such as a personal computer including the one or more processors) may render the audio and visual content, while the wearable device 800 may determine the translational head movement upon which the dedicated computing device may render, based on the translational head movement, the audio content (as the speaker feeds) in accordance with various aspects of the techniques described in this disclosure. As another example, when the wearable device 800 represents smart glasses, the wearable device 800 may include the one or more processors that both determine the translational head movement (by interfacing with one or more sensors of the wearable device 800) and render, based on the determined translational head movement, the speaker feeds.

As shown, the wearable device 800 includes a rear camera, one or more directional speakers, one or more tracking and/or recording cameras, and one or more light-emitting diode (LED) lights. In some examples, the LED light(s) may be referred to as "ultra bright" LED light(s). In addition, the wearable device 800 includes one or more eye-tracking cameras, high sensitivity audio microphones, and optics/projection hardware. The optics/projection hardware of the wearable device 800 may include durable semi-transparent display technology and hardware.

The wearable device 800 also includes connectivity hardware, which may represent one or more network interfaces that support multimode connectivity, such as 4G communications, 5G communications, etc. The wearable device 800 also includes ambient light sensors, and bone conduction transducers. In some instances, the wearable device 800 may also include one or more passive and/or active cameras with fisheye lenses and/or telephoto lenses. Various devices of this disclosure, such as the content consumer device 14 of FIG. 1A may use the steering angle of the wearable device 800 to select an audio representation of a soundfield (e.g., one of the MOA representations) to output via the directional speaker(s)—headphones 404—of the wearable device 800, in accordance with various techniques of this disclosure. It will be appreciated that the wearable device 800 may exhibit a variety of different form factors.

Furthermore, the tracking and recording cameras and other sensors may facilitate the determination of translational distance. Although not shown in the example of FIG. 4, wearable device 800 may include the above discussed MEMS or other types of sensors for detecting translational distance 606.

Although described with respect to particular examples of wearable devices, such as the VR device 400 discussed above with respect to the examples of FIG. 2 and other devices set forth in the examples of FIGS. 1A and 1B, a person of ordinary skill in the art would appreciate that descriptions related to FIGS. 1A-2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 5A:
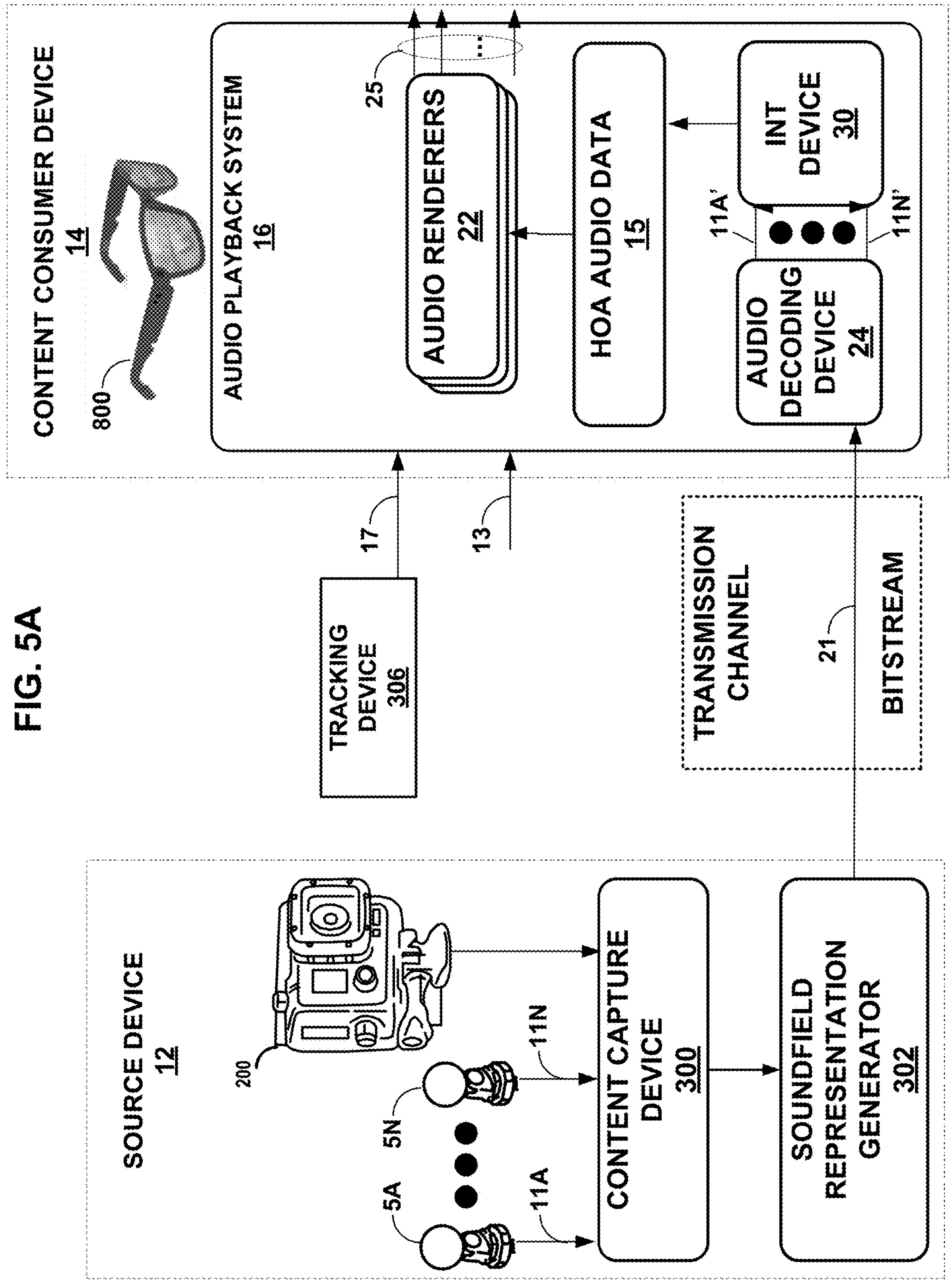
FIGS. 5A and 5B are diagrams illustrating other example systems that may perform various aspects of the techniques described in this disclosure.
Figure 5B:
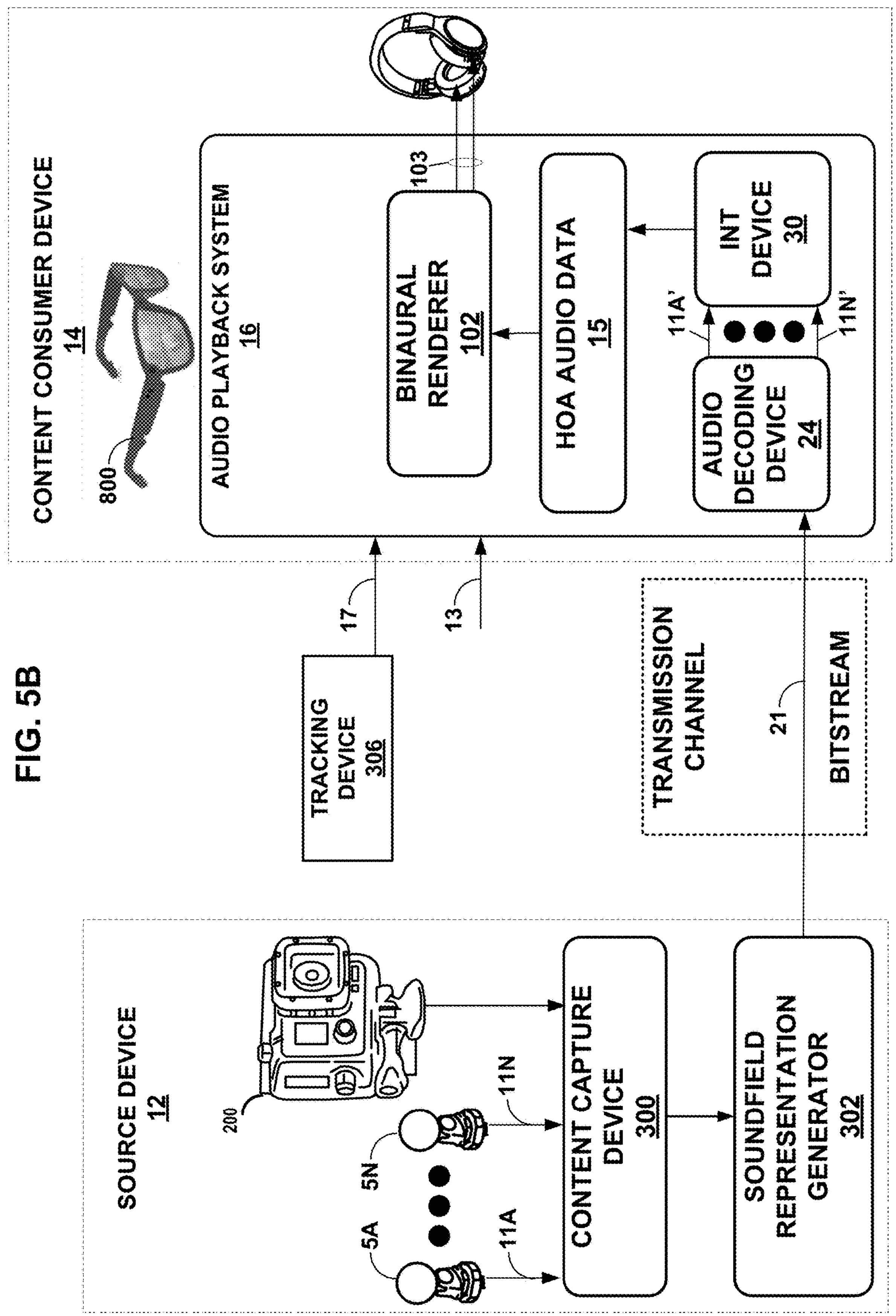

FIGS. 5A and 5B are diagrams illustrating example systems that may perform various aspects of the techniques described in this disclosure. FIG. 5A illustrates an example in which the source device 12 further includes a camera 200. The camera 200 may be configured to capture video data, and provide the captured raw video data to the content capture device 300. The content capture device 300 may provide the video data to another component of the source device 12, for further processing into viewport-divided portions.

In the example of FIG. 5A, the content consumer device 14 also includes the wearable device 800. It will be understood that, in various implementations, the wearable device 800 may be included in, or externally coupled to, the content consumer device 14. As discussed above with respect to FIG. 4, the wearable device 800 includes display hardware and speaker hardware for outputting video data (e.g., as associated with various viewports) and for rendering audio data.

FIG. 5B illustrates an example similar that illustrated by FIG. 5A, except that the audio renderers 22 shown in FIG. 5A are replaced with a binaural renderer 102 capable of performing binaural rendering using one or more HRTFs or the other functions capable of rendering to left and right speaker feeds 103. The audio playback system 16 may output the left and right speaker feeds 103 to headphones 104.

The headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the HOA coefficients 11. The headphones 104 may include a left headphone speaker and a right headphone speaker which are powered (or, in other words, driven) by the corresponding left and right speaker feeds 103.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video packets, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

Figure 6:
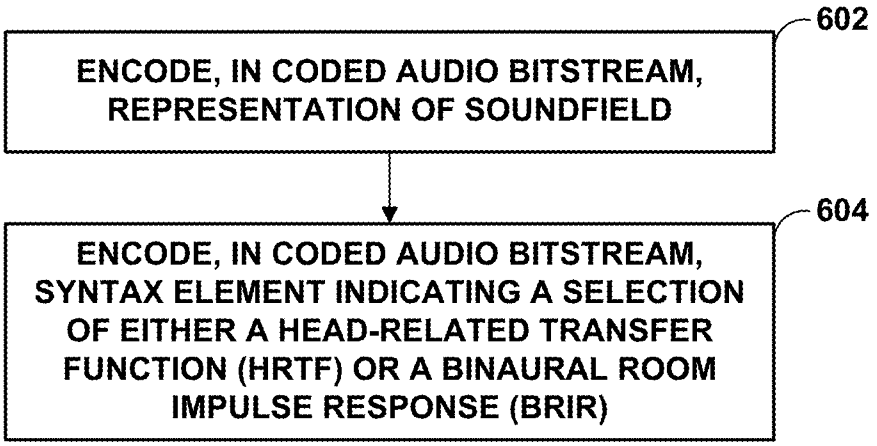
FIG. 6 is a flowchart illustrating an example method for signaling the use/disuse and any relevant parameters of additional audio tools, in accordance with one or more techniques of this disclosure.

FIG. 6 is a flowchart illustrating an example method for signaling the use/disuse and any relevant parameters of additional audio tools, in accordance with one or more techniques of this disclosure. The method of FIG. 6 may be performed by an audio encoding device, such as source device 12 of FIGS. 1A, 1B, 5A, and 5B.

An audio encoding device may encode, in a coded audio bitstream, a representation of a soundfield (602). For instance, the soundfield representation generator 302 of source device 12 may generate one or more bitstreams 21 based, at least in part, on audio content (e.g., MOA representations and/or third order HOA representations) generated from HOA coefficients. The bitstream 21 may represent a compressed version of the HOA coefficients (and/or the partial subsets thereof used to form MOA representations of the soundfield) and any other different types of the content 301 (such as a compressed version of spherical video data, image data, or text data).

The audio encoding device may encode, in the coded audio bitstream, a syntax element indicating a selection of either a head-related transfer function (HRTF) or a binaural room impulse response (BRIR) for rendering the soundfield (604). For instance, soundfield representation generator 302 may encode, in the bitstream 21, a flag indicating whether the HRTF or the BRIR should be used to render the soundfield represented in the bitstream 21.

In some examples, the audio encoding device may select the HRTF or the BRIR based on a current location of one or more microphones (e.g., that generated signals on which the representation of the soundfield is based, such as microphone 5). For instance, source device 12 may determine a current location of the one or more microphones, such as microphone 5. Source device 12 may determine the current location based on signals generated by one or more sensors. Such as one or more ambient light sensors, one or more global positioning system (GPS), or any other such sensor or combination of sensors. Source device 12 may select, based the current location of the one or more microphones, the HRTF or the BRIR. As one example, source device 12 may select the HRTF responsive to determining that the current location is outdoor. As another example, source device 12 may select the BRIR responsive to determining that the current location is indoor.

Figure 7:
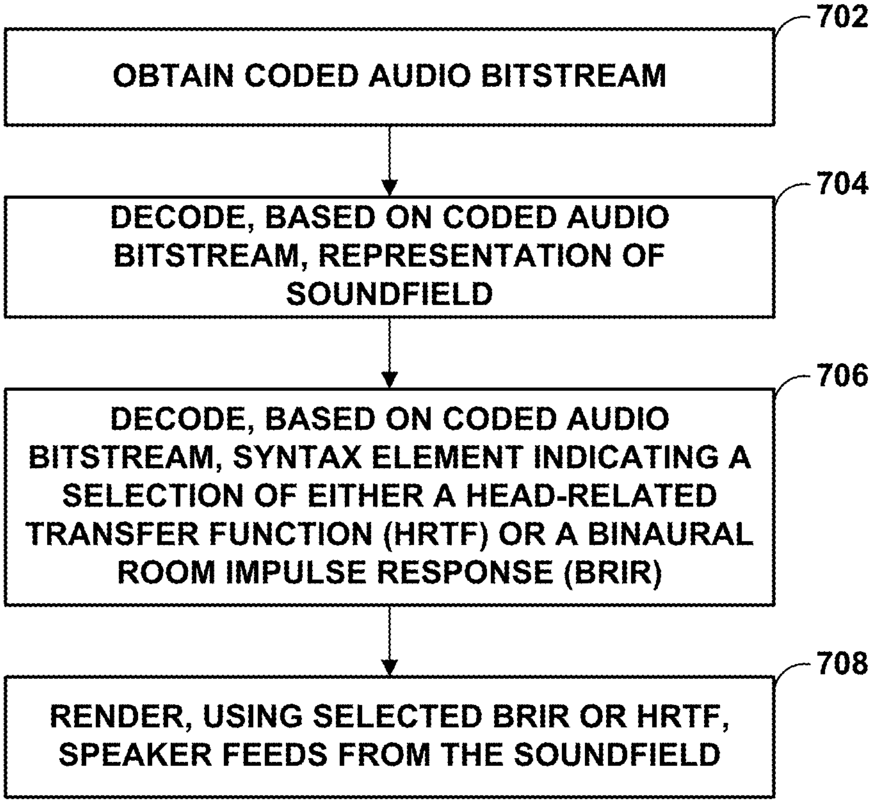
FIG. 7 is a flowchart illustrating an example method for signaling the use/disuse and any relevant parameters of additional audio tools, in accordance with one or more techniques of this disclosure.

FIG. 7 is a flowchart illustrating an example method for signaling the use/disuse and any relevant parameters of additional audio tools, in accordance with one or more techniques of this disclosure. The method of FIG. 7 may be performed by an audio decoding device, such as audio playback system 16 of FIGS. 1A, 1B, 5A, and 5B, or decoder system 500 of FIG. 3.

An audio decoding device may obtain a coded audio bitstream (702). For instance, audio decoding device 24 of audio playback system 16 may obtain the bitstream 21.

The audio decoding device may decode based on the coded audio bitstream, a representation of a soundfield (704). For instance, audio decoding device 24 may decode bitstream 21 to output reconstructed audio data 11A'-11N'

(which may form the full third order HOA representation or a subset thereof that forms an MOA representation of the same soundfield or decompositions thereof, such as the predominant audio signal, ambient HOA coefficients, and the vector based signal described in the MPEG-H 3D Audio Coding Standard).

The audio decoding device may decode, based on the coded audio bitstream, a syntax element indicating a selection of either a head-related transfer function (HRTF) or a binaural room impulse response (BRIR) (706). For instance, audio decoding device 24 may obtain, from the bitstream 21, a flag indicating whether the HRTF or the BRIR should be used to render the soundfield represented in the bitstream 21.

The audio decoding device 24 may render, using the selected HRTF or BRIR, speaker feeds from the soundfield (708). For instance, audio playback system 16 may select renderers 22 or binaural render 102 to render speaker feeds. As one example, where the flag indicates the use of HRTF, audio playback system 16 may select binaural renderer 102 to perform binaural rendering using one or more HRTFs to render to left and right speaker feeds 103. As another example, where the flag indicates the user of BRIR, audio playback system 16 may select renderers 22 to render speaker feeds 25.

The following numbered examples may illustrate one or more aspects of the disclosure:

Example 1. An audio decoding device comprising: a memory configured to store at least a portion of a coded audio bitstream; and one or more processors configured to: decode, based on the coded audio bitstream, a representation of a soundfield; decode, based on the coded audio bitstream, a syntax element indicating a selection of either a head-related transfer function (HRTF) or a binaural room impulse response (BRIR); and render, using the selected HRTF or BRIR, speaker feeds from the soundfield.

Example 2. The audio decoding device of example 1, wherein the one or more processors are further configured to: decode, based on the coded audio bitstream, a syntax element indicating whether reverb is enabled or disabled, wherein the one or more processors are further configured to render the speaker feeds selectively using reverb based on the syntax element indicating whether reverb is enabled or disabled.

Example 3. The audio decoding device of any combination of example 1 and 2, wherein the one or more processors are further configured to: decode, based on the coded audio bitstream, a syntax element indicating whether doppler is enabled or disabled, wherein the one or more processors are further configured to render the speaker feeds selectively using doppler based on the syntax element indicating whether doppler is enabled or disabled.

Example 4. The audio decoding device of any combination of examples 1-3, wherein the one or more processors are further configured to: decode, based on the coded audio bitstream, a syntax element indicating whether occlusion is enabled or disabled, wherein the one or more processors are further configured to render the speaker feeds selectively using occlusion based on the syntax element indicating whether occlusion is enabled or disabled.

Example 5. The audio decoding device of any combination of examples 1-3, wherein the one or more processors are further configured to: decode, based on the coded audio bitstream, a plurality of room reverb coefficient sets, each of the room reverb coefficient sets corresponding to a different candidate position; and select a particular room reverb coefficient set from the plurality of room reverb coefficient sets, wherein the one or more processors are further configured to render the speaker feeds using the selected room reverb coefficient set.

Example 6. An audio encoding device comprising: a memory configured to store at least a portion of a coded audio bitstream; and one or more processors configured to: encode, in the coded audio bitstream, a representation of a soundfield; and encode, in the coded audio bitstream, a syntax element indicating a selection of either a head-related transfer function (HRTF) or a binaural room impulse response (BRIR) for rendering the soundfield.

Example 7. The audio encoding device of example 6, wherein the one or more processors are further configured to: encode, in the coded audio bitstream, a syntax element indicating whether reverb is enabled or disabled when rendering the soundfield.

Example 8. The audio encoding device of any combination of examples 6 and 7, wherein the one or more processors are further configured to: encode, in the coded audio bitstream, a syntax element indicating whether doppler is enabled or disabled when rendering the soundfield.

Example 9. The audio encoding device of any combination of examples 6-8, wherein the one or more processors are further configured to: encode, in the coded audio bitstream, a syntax element indicating whether occlusion is enabled or disabled when rendering the soundfield.

Example 10. The audio encoding device of any combination of examples 6-9, wherein the one or more processors are further configured to: encode, in the coded audio bitstream and for the soundfield, a plurality of room reverb coefficient sets, each of the room reverb coefficient sets corresponding to a different candidate position.

Example 11. The audio encoding device of any of examples 6-10, wherein the one or more processors are further configured to: generate, based on signals generated by one or more microphones, the representation of the soundfield.

Example 12. The audio encoding device of example 11, wherein the one or more processors are further configured to: determine a current location of the one or more microphones; and select, based the current location of the one or more microphones, the HRTF or the BRIR.

Example 13. The audio encoding device of example 12, wherein, to select the HRTF or the BRIR, the one or more processors are configured to: select the HRTF responsive to determining that the current location is outdoor; and select the BRIR responsive to determining that the current location is indoor.

Example 14. A method comprising: decoding, based on a coded audio bitstream, a representation of a soundfield; decoding, based on the coded audio bitstream, a syntax element indicating a selection of either a head-related transfer function (HRTF) or a binaural room impulse response (BRIR); and rendering, using the selected HRTF or BRIR, speaker feeds from the soundfield.

Example 15. The method of example 14, further comprising: decoding, based on the coded audio bitstream, a syntax element indicating whether reverb is enabled or disabled, wherein rendering the speaker feeds comprises rendering the speaker feeds selectively using reverb based on the syntax element.

Example 16. The method of any combination of examples 14 and 15, further comprising: decoding, based on the coded audio bitstream, a syntax element indicating whether doppler is enabled or disabled, wherein rendering the speaker feeds comprises rendering the speaker feeds selectively using doppler based on the syntax element.

Example 17. The method of any combination of examples 14-16, further comprising: decoding, based on the coded audio bitstream, a syntax element indicating whether occlusion is enabled or disabled, wherein rendering the speaker feeds comprises rendering the speaker feeds selectively using occlusion based on the syntax element.

Example 18. The method of any combination of examples 14-17, further comprising: decoding, based on the coded audio bitstream, a plurality of room reverb coefficient sets, each of the room reverb coefficient sets corresponding to a different candidate position; and selecting a particular room reverb coefficient set from the plurality of room reverb coefficient sets, wherein rendering the speaker feeds comprises rendering, using the selected room reverb coefficient set, the speaker feeds from the soundfield.

Example 19. A method comprising: encoding, in a coded audio bitstream, a representation of a soundfield; and encoding, in the coded audio bitstream, a syntax element indicating a selection of either a head-related transfer function (HRTF) or a binaural room impulse response (BRIR) for rendering the soundfield.

Example 20. The method of example 19, further comprising: encoding, in the coded audio bitstream, a syntax element indicating whether reverb is enabled or disabled when rendering the soundfield.

Example 21. The method of any combination of examples 19 and 20, further comprising: encoding, in the coded audio bitstream, a syntax element indicating whether doppler is enabled or disabled when rendering the soundfield.

Example 22. The method of any combination of examples 19-21, further comprising: encoding, in the coded audio bitstream, a syntax element indicating whether occlusion is enabled or disabled when rendering the soundfield.

Example 23. The method of any combination of examples 19-22, further comprising: encoding, in the coded audio bitstream and for the soundfield, a plurality of room reverb coefficient sets, each of the room reverb coefficient sets corresponding to a different candidate position.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, including fixed function processing circuitry and/or programmable processing circuitry, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An audio decoding device included in an extended reality (XR) headset, the audio decoding device comprising:

a memory configured to store at least a portion of a coded audio bitstream; and one or more processors configured to:

decode, based on the coded audio bitstream, a representation of a soundfield having multiple degrees of freedom;

decode, based on the coded audio bitstream, a first syntax element indicating whether reverb is enabled or disabled;

responsive to the first syntax element indicating that reverb is enabled:

decode, based on the coded audio bitstream, a plurality of room reverb coefficient sets for a room, each of the room reverb coefficient sets corresponding to a different candidate listener position in the room; and select, based on data generated by one or more sensors of the XR headset, a particular room reverb coefficient set from the plurality of room reverb coefficient sets that corresponds to a translational position of the XR headset within the room; and render, by a multiple degree of freedom audio renderer and selectively using reverb based on the first syntax element and using the particular room reverb coefficient set, speaker feeds from the soundfield, wherein the XR headset includes a plurality of speakers driven via the rendered speaker feeds.

2. The audio decoding device of claim 1, wherein the one or more processors are further configured to:

decode, based on the coded audio bitstream, a second syntax element indicating whether doppler is enabled or disabled, wherein the one or more processors are further configured to render the speaker feeds selectively using doppler based on the second syntax element indicating whether doppler is enabled or disabled.

3. The audio decoding device of claim 2, wherein the one or more processors are further configured to:

decode, based on the coded audio bitstream, a third syntax element indicating whether occlusion is enabled or disabled, wherein the one or more processors are further configured to render the speaker feeds selectively using occlusion based on the third syntax element indicating whether occlusion is enabled or disabled.

4. The audio decoding device of claim 1, wherein the XR headset further comprises a display configured to output video to a wearer of the XR headset.

5. The audio decoding device of claim 1, wherein the soundfield has six degrees of freedom, and wherein the multiple degree of freedom audio renderer comprises a six degree of freedom audio renderer.

6. The audio decoding device of claim 1, wherein the soundfield has three degrees of freedom, and wherein the multiple degree of freedom audio renderer comprises a three degree of freedom audio renderer.

7. The audio decoding device of claim 1, wherein the multiple degree of freedom audio renderer comprises a metadata interface that is configured to receive the first syntax element.

8. An audio encoding device comprising:

a memory configured to store at least a portion of a coded audio bitstream; and one or more processors configured to:

encode, in the coded audio bitstream, a representation of a soundfield having multiple degrees of freedom;

encode, in metadata of the coded audio bitstream, a first syntax element indicating whether reverb is enabled or disabled when rendering the soundfield; and where the first syntax element indicates that reverb is enabled:

encode, in on the coded audio bitstream, a plurality of room reverb coefficient sets for a room, each of the room reverb coefficient sets corresponding to a different candidate listener position in the room.

9. The audio encoding device of claim 8, wherein the one or more processors are further configured to:

encode, in the coded audio bitstream, a second syntax element indicating whether doppler is enabled or disabled when rendering the soundfield.

10. The audio encoding device claim 9, wherein the one or more processors are further configured to:

encode, in the coded audio bitstream, a third syntax element indicating whether occlusion is enabled or disabled when rendering the soundfield.

11. The audio encoding device of claim 10, wherein the one or more processors are further configured to:

generate, based on signals generated by one or more microphones and by a 6DoF audio encoder, the representation of the soundfield.

12. A non-transitory computer-readable storage medium storing instructions that, when executed, cause an audio decoding device to:

decode, based on a coded audio bitstream, a representation of a soundfield having multiple degrees of freedom;

decode, based on the coded audio bitstream, a first syntax element indicating whether reverb is enabled or disabled;

responsive to the first syntax element indicating that reverb is enabled:

decode, based on the coded audio bitstream, a plurality of room reverb coefficient sets for a room, each of the room reverb coefficient sets corresponding to a different candidate listener position in the room; and select, based on data generated by one or more sensors of an XR headset, a particular room reverb coefficient set from the plurality of room reverb coefficient sets that corresponds to a translational position of the XR headset within the room; and render, by a multiple degree of freedom audio renderer and selectively using reverb based on the first syntax element and using the particular room reverb coefficient set, speaker feeds from the soundfield, wherein the XR headset includes a plurality of speakers driven via the rendered speaker feeds.

13. The non-transitory computer-readable storage medium of claim 12, further comprising instructions that cause the audio decoding device to:

decode, based on the coded audio bitstream, a second syntax element indicating whether doppler is enabled or disabled, render the speaker feeds selectively using doppler based on the second syntax element indicating whether doppler is enabled or disabled.

14. The non-transitory computer-readable storage medium of claim 13, further comprising instructions that cause the audio decoding device to:

decode, based on the coded audio bitstream, a third syntax element indicating whether occlusion is enabled or disabled, render the speaker feeds selectively using occlusion based on the third syntax element indicating whether occlusion is enabled or disabled.

15. The non-transitory computer-readable storage medium of claim 12, wherein the XR headset further comprises a display configured to output video to a wearer of the XR headset.

16. The non-transitory computer-readable storage medium of claim 12, wherein the soundfield has six degrees of freedom, and wherein the multiple degree of freedom audio renderer comprises a six degree of freedom audio renderer.

17. The non-transitory computer-readable storage medium of claim 12, wherein the multiple degree of freedom audio renderer comprises a metadata interface that is configured to receive the first syntax element.

* * * * *